(12) United States Patent
Chiang et al.

(10) Patent No.: US 7,570,826 B2
(45) Date of Patent: Aug. 4, 2009

(54) METHOD FOR IMPROVING PRINT QUALITY BY USING LOSSLESS IMAGE COMPRESSION (JPEG-LS) TECHNOLOGY AND SYSTEM THEREOF

(75) Inventors: Cheng-Huei Chiang, Taichung County (TW); Chen-Chung Chen, Tao-Yuan County (TW)

(73) Assignee: Lite-On Technology Corporation, Taipei (TW)

( * ) Notice: Subject to any disclaimer, the term of this patent is extended or adjusted under 35 U.S.C. 154(b) by 821 days.

(21) Appl. No.: 11/322,337

(22) Filed: Jan. 3, 2006

(65) Prior Publication Data

US 2007/0031053 A1 Feb. 8, 2007

(30) Foreign Application Priority Data

Aug. 8, 2005 (TW) .............................. 94126869 A

(51) Int. Cl.
*G06K 9/46* (2006.01)

(52) U.S. Cl. .................. 382/244; 382/232; 382/237; 358/3.15; 358/1.9

(58) Field of Classification Search ....... 358/3.03–3.06, 358/3.21, 3.15, 1.9; 382/244, 252, 232, 237
See application file for complete search history.

(56) References Cited

U.S. PATENT DOCUMENTS 5,903,676 A * 5/1999 Wu et al. ..................... 382/244
2003/0202708 A1* 10/2003 Renshaw et al. ............ 382/243

* cited by examiner

*Primary Examiner*—Benny Q Tieu
*Assistant Examiner*—Quyen Ngo
(74) *Attorney, Agent, or Firm*—Rabin & Berdo, P.C.

(57) ABSTRACT

A method for improving print quality by using lossless image compression (JPEG-LS) technology and system thereof are provided. The detailed characteristics of prediction errors generated during lossless image compression encoding or decoding process are retrieved and fed back to a halftone print mode of the printer and are used to adjust the halftone print mode.

20 Claims, 6 Drawing Sheets

|  |  |  |
|---|---|---|
| 1 | -32 | 0 |
| 1 | -35 | -2 |
| 0 | -33 | -1 |

FIG.3B

|  |  |  |
|---|---|---|
| P0 | P3 | P6 |
| P1 | P4 | P7 |
| P2 | P5 | P8 |

FIG.3A

METHOD FOR IMPROVING PRINT QUALITY BY USING LOSSLESS IMAGE COMPRESSION (JPEG-LS) TECHNOLOGY AND SYSTEM THEREOF

CROSS-REFERENCE TO RELATED APPLICATION

This non-provisional application claims priority under 35 U.S.C. § 119(a) on Patent Application No(s). 094126869 filed in Taiwan on Aug. 8, 2005, the entire contents of which are hereby incorporated by reference.

BACKGROUND OF THE INVENTION

1. Field of Invention

The present invention relates to a method for improving print quality and a corresponding system, more specifically, to a method for improving print quality by using lossless image compression technology and a corresponding system.

2. Related Art

Certain detailed characteristics of an image will be weakened during the transmission between media. For example, when an image is outputted to a printer or a screen or other output terminals, the image output may be blurred to some degree due to the different processing abilities of different devices.

If the image contains both text and graphics, the text and graphics need to be separated first by text/graphical separation and then processed according to their different characteristics so as to improve the quality of the image. For example, the charge coupled device has an RGB (red-green-blue) color correction problem and is not sensitive to the edge of black-and-white text; therefore, the text portion of the image will be processed through an edge enhancement filter, and the graphical portion will be processed through a de-screening filter. As such, the output image produced through the above procedures may be lossless.

Therefore, for the application of copy and print, whether the output image is lossless or not depends largely on the separation of the text portion and the graphical portion of images.

Therefore, in order to improve the output image quality, most research and development have been focusing on how to improve the separation of the text and graphical portions of images.

Besides the technology of separating the text and the graphic portions of images, if detailed characteristics of an image can be separated and processed, it will improve the smoothness and edge-sharpening of images and hence the quality of the print.

SUMMARY OF THE INVENTION

In order to solve the problems described above, the present invention provides a method and a system for improving print quality by using the lossless image compression technology, wherein the detailed characteristics of images are retrieved and processed so that further separation of text and graphics of the images may be achieved. Further, appropriate halftone process mode, such as error diffusion method, may be used to enhance local print characteristics. As a result, the output images look smooth and have high print quality.

The original image that needs to be printed is scanned by a scanner or is inputted by other devices to be converted in a lossless image compression format (e.g. JPEG-LS). During the image encoding process or the image decoding process before outputted to a printer, the detailed characteristics of the prediction errors of the images are analyzed, which include errors in the characteristic values of both image details' intensity (i.e. edge intensity) and image details' orientation (i.e. edge orientation). The detailed characteristics of the prediction errors are fed back to the halftone print mode of a printer and are used to adjust the halftone print mode, so that the print quality may be improved.

By means of the present invention, the quality of printing a document or an image produced by the lossless image compression technology will be improved without adding complicated calculations. In the print mode, an error diffusion method and a corresponding quantizer and an appropriate adaptive error filter are utilized to achieve improvement in the quality of print characteristics.

The method for improving print quality by using the lossless image compression technology in this invention includes: retrieving prediction errors of the image pixel generated during the lossless image compression encoding or decoding process; calculating the characteristic value of image details' intensity and the characteristic value of image details' orientation according to the prediction errors; and feeding back the characteristic values to the pre-print mode to improve print quality.

The system using the method for improving print quality by means of the lossless image compression technology in this invention includes: a lossless image compression encoding and decoding module, which encodes or decodes input images and generates prediction errors during the process; a characteristics generating module calculating the characteristic values of image details' intensity and image details' orientation according to the prediction errors; and a halftone module for halftoning the image by using the characteristic values of image details' intensity and image details' orientation to improve print quality.

Further, a text/graphical separation module may be used to separate the text portion and the graphic portion of the images; a color separation module may be used to convert image data from RGB to CMYK (cyan-magenta-yellow-black); and a characteristics enhancement module may be used to enhance the print characteristics of the images.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein:

FIG. 3A and FIG. 3B respectively illustrate an N by N mask with a pixel as pixels' center and the distribution of the prediction errors of the pixel and adjacent pixels around the pixel in the N by N mask.

DETAILED DESCRIPTION OF THE INVENTION

The exemplary embodiments of the present invention provide methods for improving the print quality of images by using the lossless image compression technology and corresponding systems. The methods include retrieving the detailed characteristics of the prediction errors generated during the lossless image compression encoding or decoding process and then feeding back to and adjusting the halftone print mode of the printer accordingly, which may improve the smoothness of the output images and hence the quality of the print.

Figure 1:
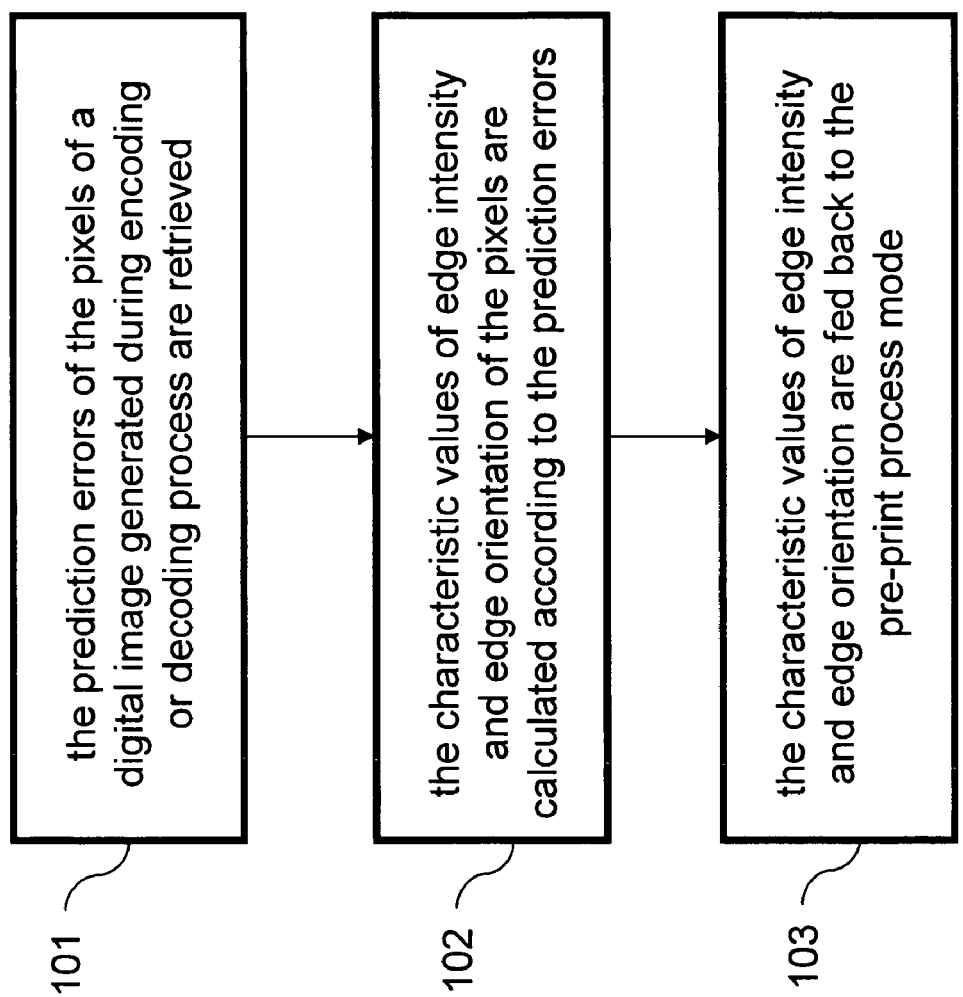
FIG. 1 illustrates a method for improving the print quality of an output image by using the lossless image compression technology according to a first embodiment of the present invention.

FIG. 1 illustrates a method for improving the print quality of an output image by using the lossless image compression technology according to a first exemplary embodiment of the present invention.

First, the prediction errors of the pixels of a digital image generated during the lossless image compression encoding or decoding process are retrieved (Step 101). Second, the characteristic values of edge intensity and edge orientation of the image pixels are calculated according to the prediction errors (Step 102). Finally, the characteristic values of edge intensity and edge orientation are fed back to the pre-print process mode (Step 103).

Wherein the characteristic value of edge intensity of the image pixels is a quantified value generated from the data processing of each pixel's tone.

The characteristic values of edge orientation of image pixels can be obtained through the following steps: forming an N by N mask with the prediction error of a pixel at the center of the N by N mask and the prediction errors of adjacent pixels around the center, wherein N is an integer greater than 1; calculating respective sums of the prediction errors in the row, column, and diagonals which respectively run through the pixel in the center of the N by N mask; and taking the largest one of the respective sums of the prediction errors as the characteristic value of edge orientation.

Therefore, after the characteristic values of edge orientation and edge intensity obtained above are fed back to a pre-print mode, such as a halftone print mode, the quality of the output image will be improved.

Figure 2:
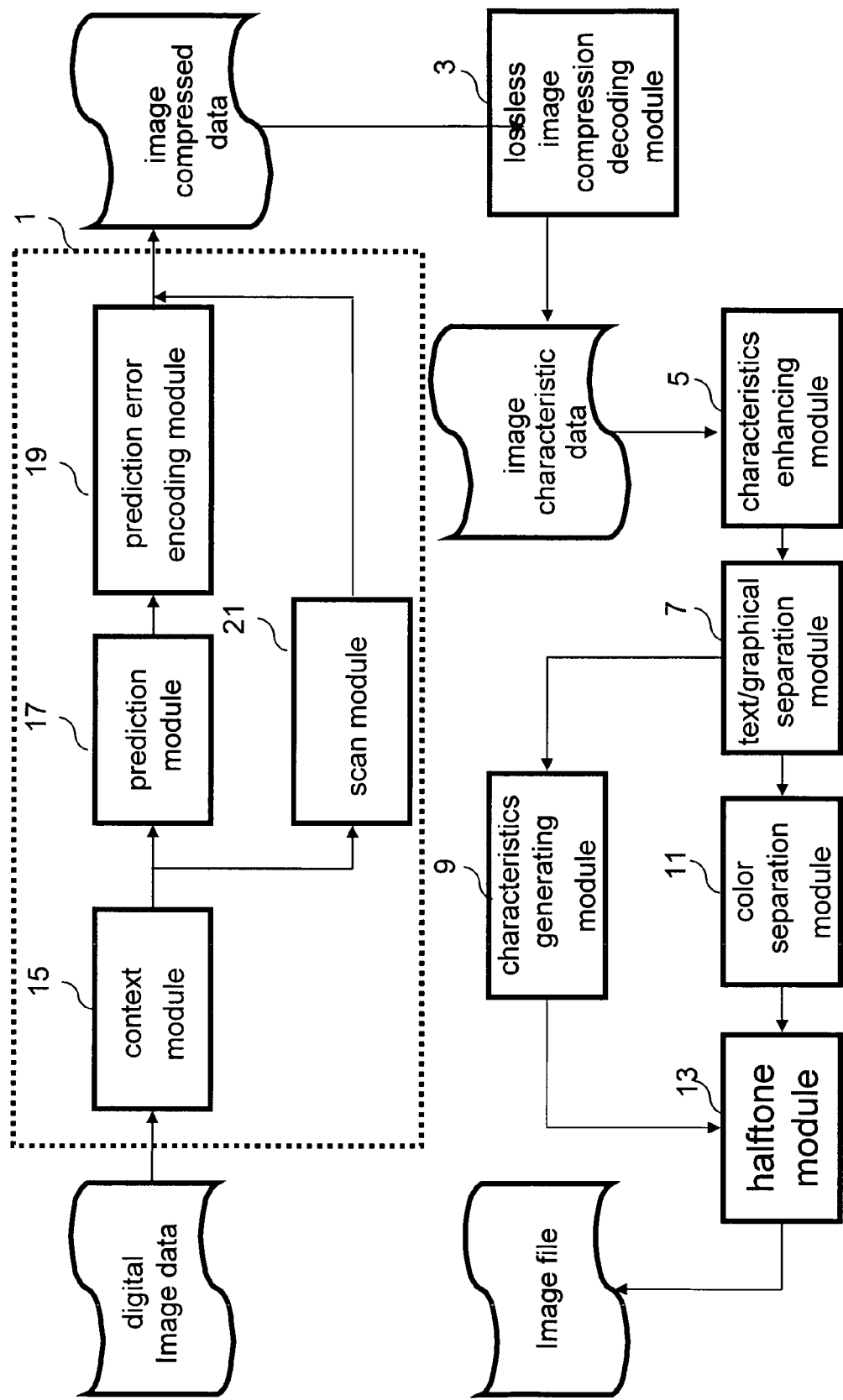
FIG. 2 illustrates a system using the method of improving print quality by means of the lossless image compression technology according to a first embodiment of the present invention (JPEG-LS).

FIG. 2 illustrates a system using the method of improving print quality by means of the lossless image compression technology according to a first embodiment of the present invention (JPEG-LS), wherein the prediction errors generated during the lossless image compression decoding process are fed back to the pre-print mode of the printer and used to adjust the halftone print mode.

As shown in FIG. 2, the system includes a lossless image compression encoding module 1, a lossless image compression decoding module 3, a characteristics enhancing module 5, a text/graphical separation module 7, a characteristics generating module 9, a color separation module 11, and a halftone module 13.

The lossless image compression encoding module 1 uses the lossless image compression technology to compress the inputted digital image data to thereby reduce the size of the data. Therefore, data can be transmitted and processed at a higher speed.

The lossless image compression encoding module 1 includes a content module 15, a prediction module 17, a prediction error encoding module 19, and a scan module 21.

The lossless image compression technology used in the lossless image compression encoding module 1 may be based on the JPEG-LS standards. However, any other types of lossless image compression technologies may be applied to the present invention.

As shown in the drawing, to print compressed data, the compressed data should be decoded by the lossless image compression decoding module 3, and then the decoded data will be processed prior to printing, e.g., characteristics enhancement, color separation, and halftone process. If not printed, the data could be automatically transmitted from the compression location (e.g. a scanner) to a data processor (e.g. a computer) to be saved or to be further processed.

In the embodiment, the absolute value of the prediction error of each of the pixels in the decoded image generated from the lossless image compression decoding module 3 is provided to the characteristic generating module 9 through the characteristic enhancement module 5 and the text/graphical separation module 7 to calculate the ratio and direction of detailed characteristics in each pixel, and to add weights to the characteristics.

More specifically, the characteristics generating module 9 generates a $W_{xi}(f)$ function of image details' intensity and a $D_{xi}(f)$ function of image details' orientation based on the absolute value of the predication error of each pixel. The $W_{xi}(f)$ function and the $D_{xi}(f)$ function may be weighted.

The $W_{xi}(f)$ function is specified as follows:

$$W_{xi}(f)=H_{xi}(f)*W_i$$

The $D_{xi}(f)$ function is specified as follows:

$$D_{xi}(f)=R_{xi}(f)*W_i$$

Where $H_{xi}(f)$ is the prediction error of the pixel, $W_i$ is a default weight defined by users or manufacturers and is a positive value. FIG. 3A and FIG. 3B respectively illustrate a 3 by 3 mask by a pixel as pixels' center and the distribution of the prediction errors of the pixel and adjacent pixels around the pixel, wherein P0, P1, P2, P3, P4, P5, P6, P7, and P8 are the different pixels within the 3 by 3 mask with the pixel P4 as pixels' center. The embodiment of the present invention uses the 3 by 3 Mask 2 shown in FIG. 3A as an example. Within the range of Mask 2, the prediction errors of the pixel P4 and the adjacent pixels around the P4 may take on values as shown by numeral 4 in FIG. 3B. $R_{xi}(f)$ is the largest value of the weighted sums of predictor errors across the row, column, and diagonals going through P4.

The $R_{xi}(f)$ function can be specified as follows:

$$R_{xi}(f)=\max\{|H_{xi}(P3)|+|H_{xi}(P4)|+|H_{xi}(P5)|,|H_{xi}(P1)|+|H_{xi}(P4)|+|H_{xi}(P7)|,|H_{xi}(P0)|+|H_{xi}(P4)|+|H_{xi}(P8)|,|H_{xi}(P2)|+|H_{xi}(P4)|+|H_{xi}(P6)|\}$$

In FIG. 3B, $R_{xi}(f)=\max\{100, 38, 37, 35\}$, wherein the largest value is 100. Therefore, $R_{xi}(f)=100$.

As described in the above example, the weighted value of each image details' intensity $W_{xi}(f)$ and the weighted value of image details' orientation $D_{xi}(f)$ may be obtained.

Once the characteristic value of image details' intensity $W_{xi}(f)$ and the characteristic value of image details' orientation $D_{xi}(f)$ of each pixel are obtained, the characteristics (text/graphical or characteristic/non-characteristic) of adjacent pixels of the each pixel will be further considered. When The adjacent pixels go through the characteristic enhancement module 5, the text/graphical separation module 7, and the color separation module 11 (as shown in FIG. 2), the association among region properties is strengthened, the rate of mis-identification of the characteristics of pixels is reduced, and RGB data are converted to CMYK data. Moreover, the characteristic value of image details' intensity $W_{xi}(f)$ and the characteristic value of image details' orientation $D_{xi}(f)$ are fed back to the halftone module 13 which will process the adjacent pixels with edge characteristics and without edge characteristics in different ways by means of the halftone error diffusion method while taking into account factors such as the edge characteristic values, the gray level, and the error accumulation. As a result, the pixel dots without edge characteristics will be much more dispersed (smoothly) by means of the original error diffusion method, and the pixel dots with edge characteristics will be more concentrated according to the characteristics value of the image details' orientation $D_{xi}(f)$ calculated in an error filter.

Figure 4:
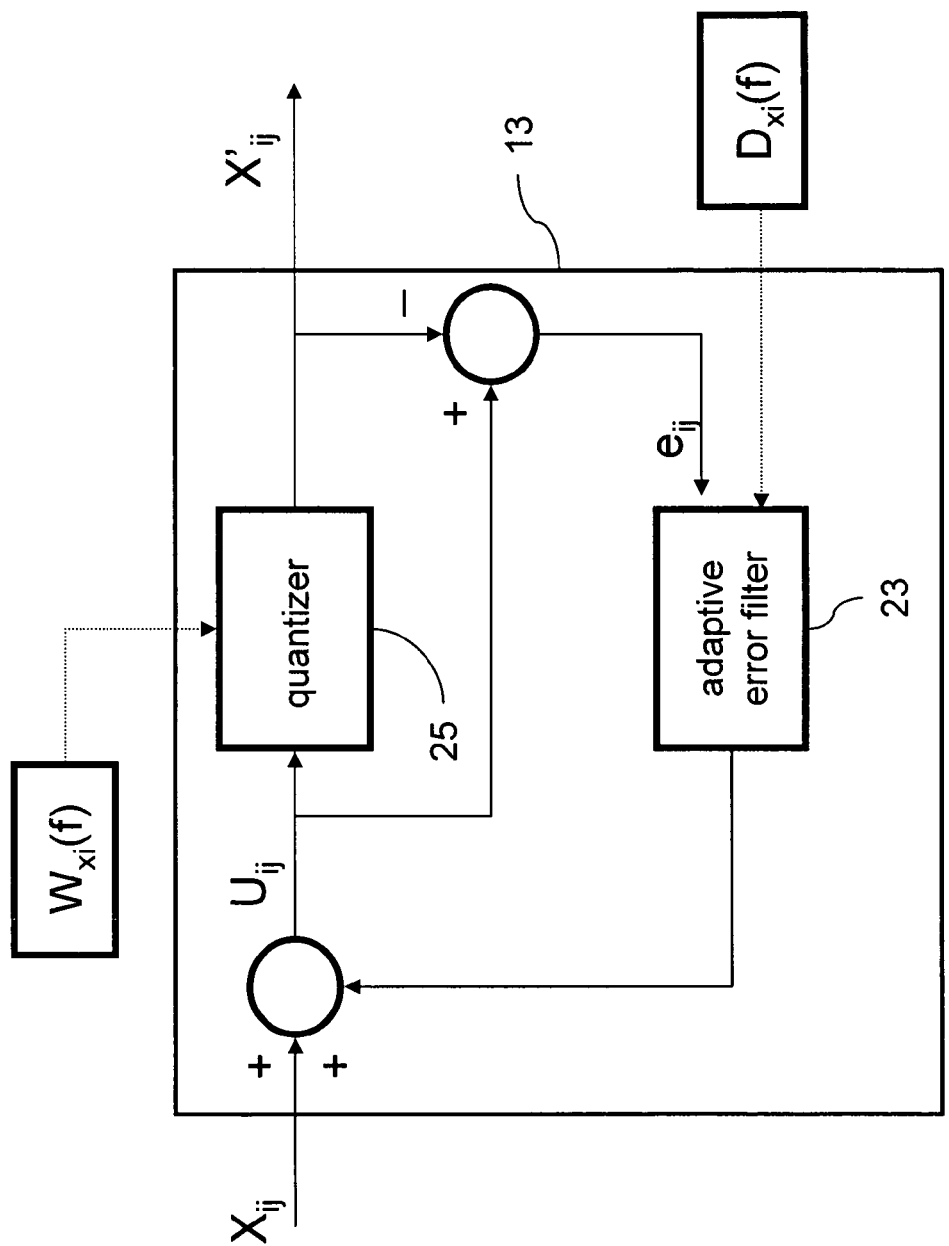
FIG. 4 illustrates how the characteristic value of image details' intensity $W_{xi}(f)$ and the characteristic value of image details' orientation $D_{xi}(f)$ cooperate with the halftone module.

FIG. 4 illustrates how the characteristic value of image details' intensity $W_{xi}(f)$ and the characteristic value of image details' orientation $D_{xi}(f)$ cooperate with the halftone module 13. In the drawing, the input image pixel $X_{ij}$ will be added to a signal generated from an adaptive error filter 23 of the halftone module 13 and thus an error accumulation status value $U_{ij}$ is produced. On the one hand, the value $U_{ij}$ will be inputted to a quantizer 25, which, together with the characteristic value of the image details' intensity $W_{xi}(f)$, determines the output of the image data. Because the characteristic value of image details' intensity $W_{xi}(f)$ may increase the error accumulation status value $U_{ij}$ or decrease the threshold of the quantizer 25, image pixels with a higher edge intensity will be output first and smooth pixels with a lower edge intensity will be output later.

On the other hand, the error value $e_{ij}$ generated from the difference between the error accumulation status value $U_{ij}$ and the output image pixel $X'_{ij}$, and the characteristic value of image details' orientation $D_{xi}(f)$ are fed back together to the adaptive error filter 23. Based on edge orientation, higher error values will be accumulated to pixel dots having higher characteristic values of image details' orientation; therefore, the error values may be distributed evenly to adjacent pixel dots according to the strength of the image details' orientation. Thus, the error diffusion method may be applied to improve the print quality.

Figure 5:
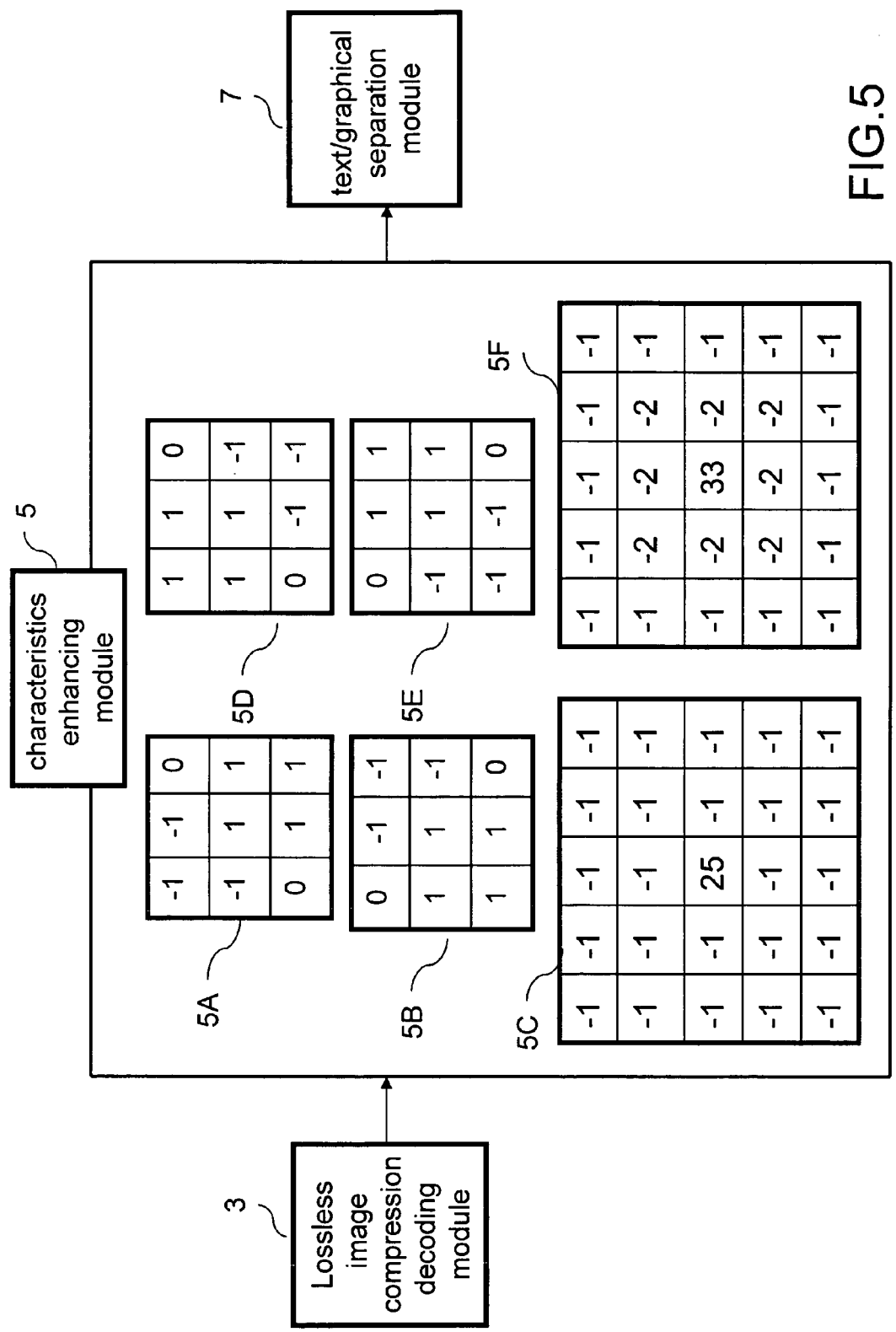
FIG. 5 illustrates a characteristic enhancement module according to an exemplary embodiment of the present invention.

FIG. 5 illustrates a characteristic enhancement module according to an exemplary 5 embodiment of the present invention. The characteristics enhancement module 5 may use one or more types of light filters (e.g., the six types of light filters 5A, 5B, 5C, 5D, 5E, and 5F shown in the figure) according to the proportions of the image characteristics to enhance the characteristics of images. Although the drawing only shows six types of light filter, in practice, other types of light filters known to persons having ordinary skills in the art may be used.

Figure 6:
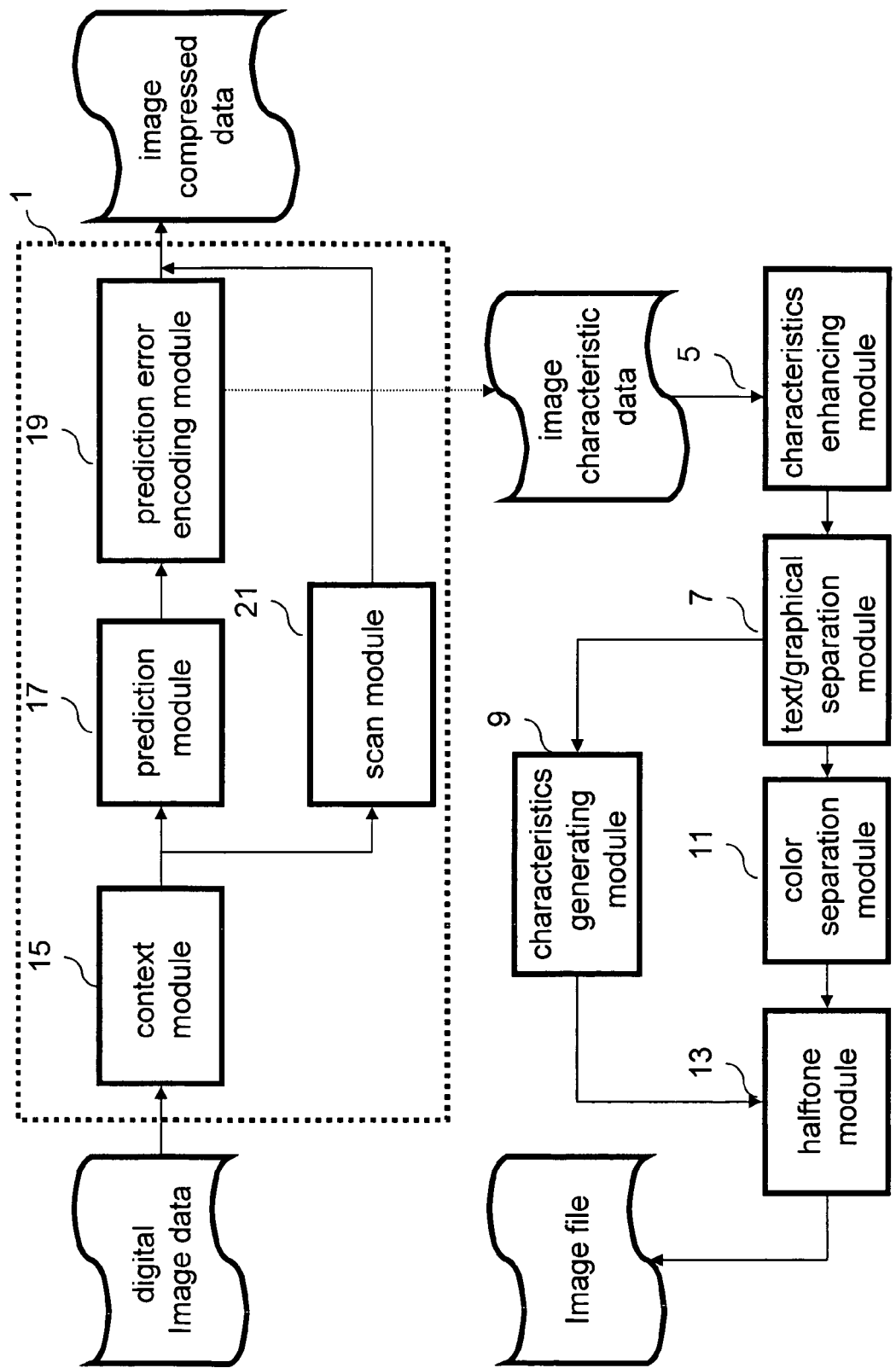
FIG. 6 illustrates a system using a method for improving print quality by means of the lossless image compression technology according to a second embodiment of the present invention.

FIG. 6 illustrates a system using a method for improving print quality by means of the lossless image compression technology according to a second embodiment of the present invention, wherein the prediction errors generated during the lossless image compression encoding process are fed back to the pre-print mode and are used to adjust the halftone print mode.

As shown in FIG. 5, the system includes a lossless image compression encoding module 1, a characteristics enhancement module 5, a text/graphical separation module 7, a characteristics generating module 9, a color separation module 11, and a halftone module 13.

Unlike the first embodiment in FIG. 2, the absolute value of the prediction error of each pixel is produced from the lossless image compression encoding module 1. Then, the absolute value is provided to the characteristics generating module 9 through the characteristics enhancement module 5 and the text/graphical separation module 7 to calculate the ratio and direction of detailed characteristics of each pixel, and to add weights to the characteristics.

The characteristics enhancement module 5, the text/graphical separation module 7, the characteristics generating module 9, the color separation module 11, and the halftone module 13 have the same functions as those modules in the first embodiment and hence will not be described here.

As described above, the method and the system according to exemplary embodiments of the present invention may improve the image smoothness and edge sharpness to thereby improve print quality.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for improving print quality by using lossless image compression technology, comprising:
   retrieving a prediction error of a pixel of a digital image generated during a lossless image compression encoding or decoding process;
   calculating a characteristic value of edge intensity of the pixel and a characteristic value of edge orientation of the pixel according to the prediction error; and
   feeding back the characteristic value of edge intensity of the pixel and the characteristic value of edge orientation of the pixel to a pre-print mode of the digital image.

2. The method for improving print quality by using lossless image compression technology of claim 1, wherein the characteristic value of edge intensity of the pixel is the prediction error of the pixel.

3. The method for improving print quality by using lossless image compression technology of claim 1, wherein calculating of the characteristic value of edge orientation of the pixel includes:
   forming an N by N mask with the prediction error of the pixel at the center of the N by N mask and the prediction errors of adjacent pixels around the center, wherein N is an integer greater than 1;
   calculating respective sums of the prediction errors in the row, column, and diagonals which respectively run through the pixel in the center of the N by N mask; and
   taking the largest one of the respective sums of the prediction errors as the characteristic value of edge orientation.

4. The method for improving print quality by using lossless image compression technology of claim 1, wherein the pre-print mode is a halftone mode.

5. The method for improving print quality by using lossless image compression of claim 4, wherein the halftone mode uses an error diffusion method.

6. The method for improving print quality by using lossless image compression technology of claim 1, wherein the characteristic value of edge intensity of the pixel and the characteristic value of edge orientation of the pixel are weighted.

7. The method for improving print quality by using lossless image compression technology of claim 1, wherein the lossless image compression encoding or decoding process is based on JPEG-LS standard.

8. A system for improving print quality by using lossless image compression technology, comprising:
   a lossless image compression encoding module for generating a prediction error of a pixel in a digital image inputted therein;
   a characteristics generating module for calculating a characteristic value of edge intensity of the pixel and a characteristic value of edge orientation of the pixel according to the prediction error; and
   a halftone module for halftoning the digital image with the characteristic value of edge intensity of the pixel and the characteristic value of edge orientation of the pixel to improve print quality.

9. The system for improving print quality by using lossless image compression technology of claim 8, wherein the characteristic value of edge intensity of the pixel is the prediction error of the pixel.

10. The system for improving print quality by using lossless image compression technology of claim 8, wherein the characteristics generating module calculates the characteristic value of edge orientation by the steps of:
   forming an N by N mask with the prediction error of the pixel at the center of the N by N mask and the prediction errors of adjacent pixels around the center, wherein N is an integer greater than 1;
   calculating respective sums of the prediction errors in the row, column, and diagonals which respectively run through the pixel in the center of the N by N mask; and
   taking the largest one of the respective sums of the prediction errors as the characteristic value of edge orientation.

11. The system for improving print quality by using lossless image compression technology of claim 8, further comprising a characteristics enhancement module connected to the lossless image compression encoding module to enhance the print characteristics of the image.

12. The system for improving print quality by using lossless image compression technology of claim 8, further comprising a text/graphical separation module connected to the characteristics enhancement module to separate the text portion and graphic portion of the digital image.

13. The system for improving print quality by using lossless image compression technology of claim 8, further comprising a color separation module connected between the text/graphical separation module and the halftone module to convert the image from RGB (red-green-blue) to CMYK (cyan-magenta-yellow-black).

14. The system for improving print quality by using lossless image compression technology of claim 8, wherein the halftone mode uses an error diffusion method.

15. The system for improving print quality by using lossless image compression technology of claim 8, wherein the characteristic value of edge intensity of the pixel and characteristic value of edge orientation of the pixel are weighted.

16. The system for improving print quality by using lossless image compression technology of claim 8, wherein the lossless image compression encoding module is JPEG-LS standard.

17. A system for improving print quality by using lossless image compression technology, comprising:
   a lossless image compression decoding module for decoding a digital image encoded by means of lossless image compression technology and generating a prediction error of a pixel of the digital image;
   a characteristics generating module for calculating a characteristic value of edge intensity of the pixel and a characteristic value of edge orientation of the pixel according to the prediction error; and
   a halftone module for halftoning the digital image with the characteristic value of edge intensity of the pixel and the characteristic value of edge orientation of the pixel to improve print quality.

18. The system for improving print quality by using lossless image compression technology of claim 17, wherein the characteristic value of edge intensity of the pixel is the prediction error of the pixel.

19. The system for improving print quality by using lossless image compression technology of claim 17, wherein the characteristics generating module calculates the characteristic value of edge orientation by the steps of:
   forming an N by N mask with the prediction error of the pixel at the center of the N by N mask and the prediction errors of adjacent pixels around the center, wherein N is an integer greater than 1;
   calculating respective sums of the prediction errors in the row, column, and diagonals which respectively run through the pixel in the center of the N by N mask; and
   taking the largest one of the respective sums of the prediction errors as the characteristic value of edge orientation.

20. The system for improving print quality by using lossless image compression technology of claim 19, wherein the characteristic value of edge intensity of the pixel and the characteristic value of edge orientation of the pixel are weighted.

* * * * *